US009550287B2

(12) United States Patent
Li

(10) Patent No.: US 9,550,287 B2
(45) Date of Patent: Jan. 24, 2017

(54) TOOL FOR INSTALLATION OF HELICAL THREADED INSERT

(71) Applicant: Yu-Hsin Li, Changhua County (TW)

(72) Inventor: Yu-Hsin Li, Changhua County (TW)

( * ) Notice: Subject to any disclaimer, the term of this patent is extended or adjusted under 35 U.S.C. 154(b) by 44 days.

(21) Appl. No.: 14/517,924

(22) Filed: Oct. 20, 2014

(65) Prior Publication Data

US 2015/0047163 A1 Feb. 19, 2015

Related U.S. Application Data

(63) Continuation of application No. 13/169,035, filed on Jun. 27, 2011, now abandoned.

(51) Int. Cl.
*B23P 19/04* (2006.01)
*B25B 27/14* (2006.01)

(52) U.S. Cl.
CPC ........ *B25B 27/143* (2013.01); *Y10T 29/53691* (2015.01)

(58) Field of Classification Search
CPC ......................... B25B 27/143; Y10T 29/53691
USPC .............. 29/240.5, 255, 270, 278, 280, 244, 29/238–239, 225–230, 254, 282, 272, 263
See application file for complete search history.

(56) References Cited

U.S. PATENT DOCUMENTS 5,212,865 A * 5/1993 Davis .................... B25B 27/143 29/240.5
7,587,799 B2 9/2009 Li
2009/0158568 A1* 6/2009 Li .......................... B25B 27/143 29/240.5

* cited by examiner

*Primary Examiner* — Monica Carter
*Assistant Examiner* — Nirvana Deonauth
(74) *Attorney, Agent, or Firm* — Guice Patents PLLC

(57) ABSTRACT

An installation tool for inserting a helical threaded insert into a tapped hole includes a driving mechanism, a series of mandrels and a series of head tubes. When a user wants to rebuild a broken tapped hole, the user can choose one mandrel and a related head tube with suitable size for rebuilding the broken tapped hole. Furthermore, a special threaded hole is defined in the head tube to reduce the size of the helical threaded insert for matching the broken tapped hole so that the user can rebuild the tapped hole easily.

6 Claims, 7 Drawing Sheets

TOOL FOR INSTALLATION OF HELICAL THREADED INSERT

BACKGROUND OF THE INVENTION

1. Field of the Invention

The present invention relates to an installation tool for inserting a helical threaded insert into a tapped hole, and more particularly to an installation tool adapted for helical threaded inserts with different sizes.

2. Description of Related Art

To reinforce the tenacity of a tapped hole, an operator usually inserts a helical threaded insert into the tapped hole. When the tapped hole is made from a relatively softer material such as plastic, wood, or the like, the helical threaded insert is employed and inserted into the tapped hole for avoiding the damage of the tapped hole. Furthermore, most of the tapped holes are often damaged after being screwed over and over again. Thus, the operator usually uses a tapping machine to rebuild the thread structure of the tapped hole. However, the diameter of the rebuilt tapped hole will become too large to fasten a screw. In order to solve this problem, the helical threaded insert is used to be inserted into the rebuilt tapped hole for maintaining a proper size corresponding to the screw.

A conventional threaded insert installation tool includes a tubular body member and a mandrel assembly. The mandrel assembly has a cylindrical rod therein. A handle is connected to the rear end of the mandrel assembly and a recess is formed on the front end of the cylindrical rod. The cylindrical rod can grasp the helical threaded insert with the recess. To rebuild a broken tapped hole, an operator may use a power drill to break the thread structure of the broken tapped hole for enlarging the tapped hole at first. Next, the operator holds the tubular body member with one hand and rotates the handle to push mandrel assembly forward with the other hand so as to force the helical threaded insert into the tapped hole. However, the helical threaded insert cannot match all sizes of the tapped hole.

To solve the aforementioned problem, another conventional threaded insert installation tool is disclosed in U.S. Patent Application No. 2009/0158568. The installation tool has a driving mechanism, a series size of head tubes and the mandrels corresponding to a series of threaded inserts. Since the head tubes and the mandrels share the same driving member, the installation tool can be made by fewer components. However, it's inconvenient to insert the helical threaded insert(s) into the tapped hole because the diameter of the helical threaded insert is usually larger than the diameter of the tapped hole. Thus, the operator must keep rotating the tool and screwing the helical threaded insert until the helical threaded insert is completely fed into the tapped hole.

The present invention has arisen to mitigate and/or obviate the disadvantages of the conventional. Further benefits and advantages of the present invention will become apparent after a careful reading of the detailed description with appropriate reference to the accompanying drawings.

SUMMARY OF THE INVENTION

The main objective of the present invention is to provide an improved installation tool for inserting a helical threaded insert into a tapped hole.

To achieve the objective, the installation tool includes a driving mechanism, at least one mandrel and at least one head tube. The driving mechanism has an external tube, an internal tube movably inserted in the external tube, and a crank handle configured to rotate the internal tube forward relative the external tube for forcing the helical threaded insert into the tapped hole. The mandrel passes through the external tube and has a rear end detachably connected to the internal tube and a front lead end to be engaged with the helical threaded insert. The head tube is detachably connected to one end of the external tube and allows the front lead end of the mandrel to pass through. The head tube has a cutout at a lateral side thereof, an alignment portion defined at a front end thereof, and a threaded hole defined through the alignment portion. The threaded hole is tapered from rear to front for reducing a diameter of the helical threaded insert for smooth transition of the helical threaded insert into the tapped hole.

Further benefits and advantages of the present invention will become apparent after a careful reading of the detailed description with appropriate reference to the accompanying drawings.

DETAILED DESCRIPTION OF THE INVENTION

Figure 1:
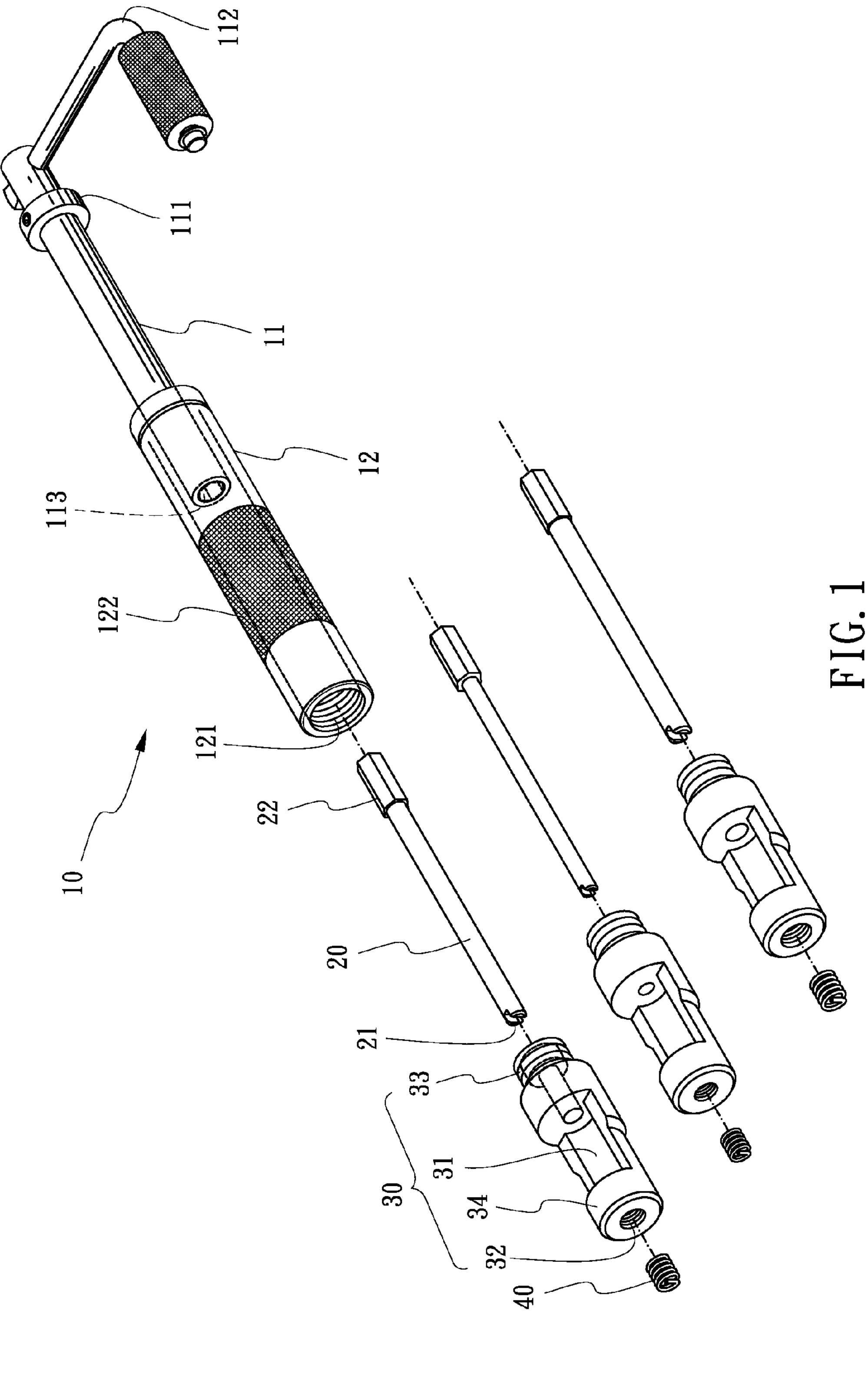
FIG. 1 is an exploded perspective view of an installation tool for a helical threaded insert according to the present invention.
Figure 2:
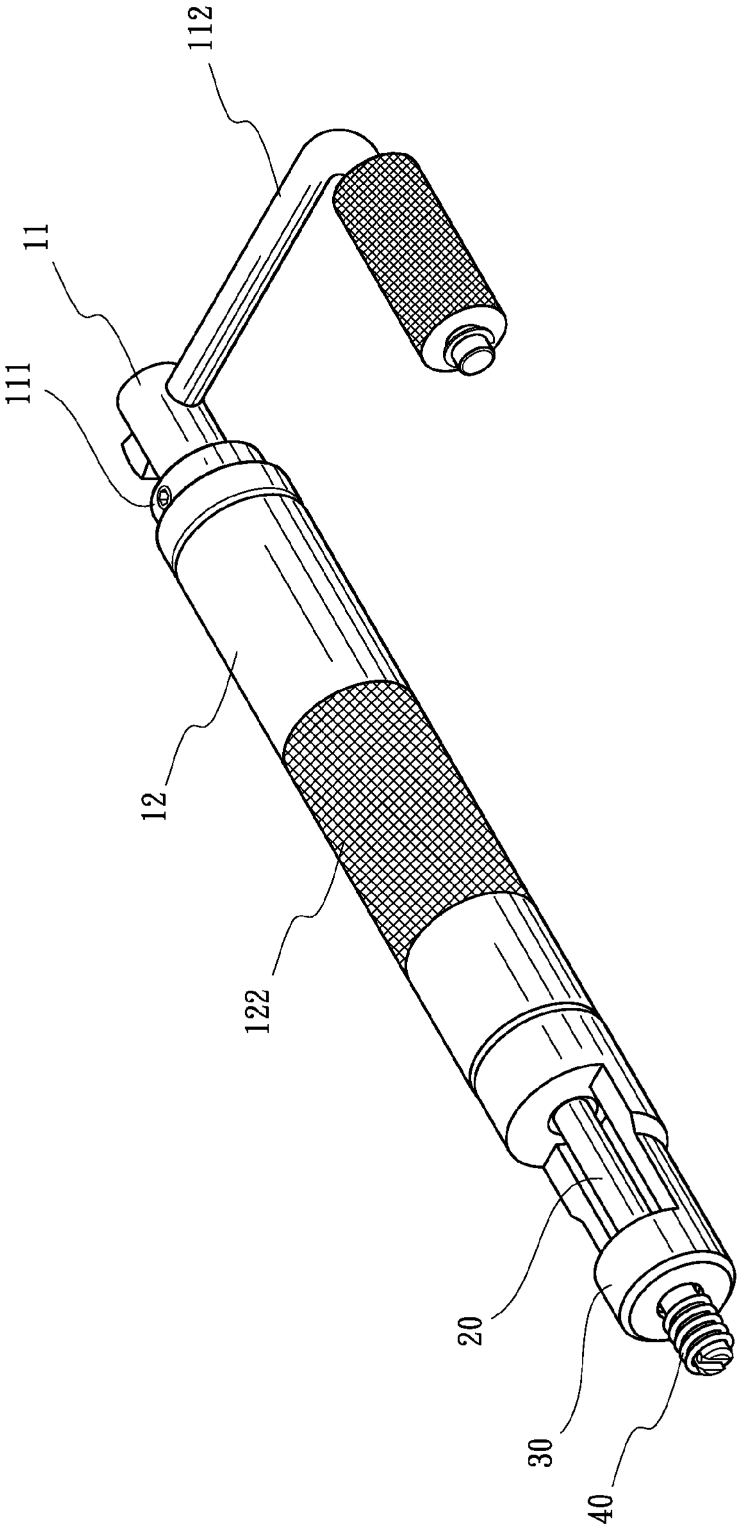
FIG. 2 is a perspective view of the installation tool shown in FIG. 1.
Figure 3:
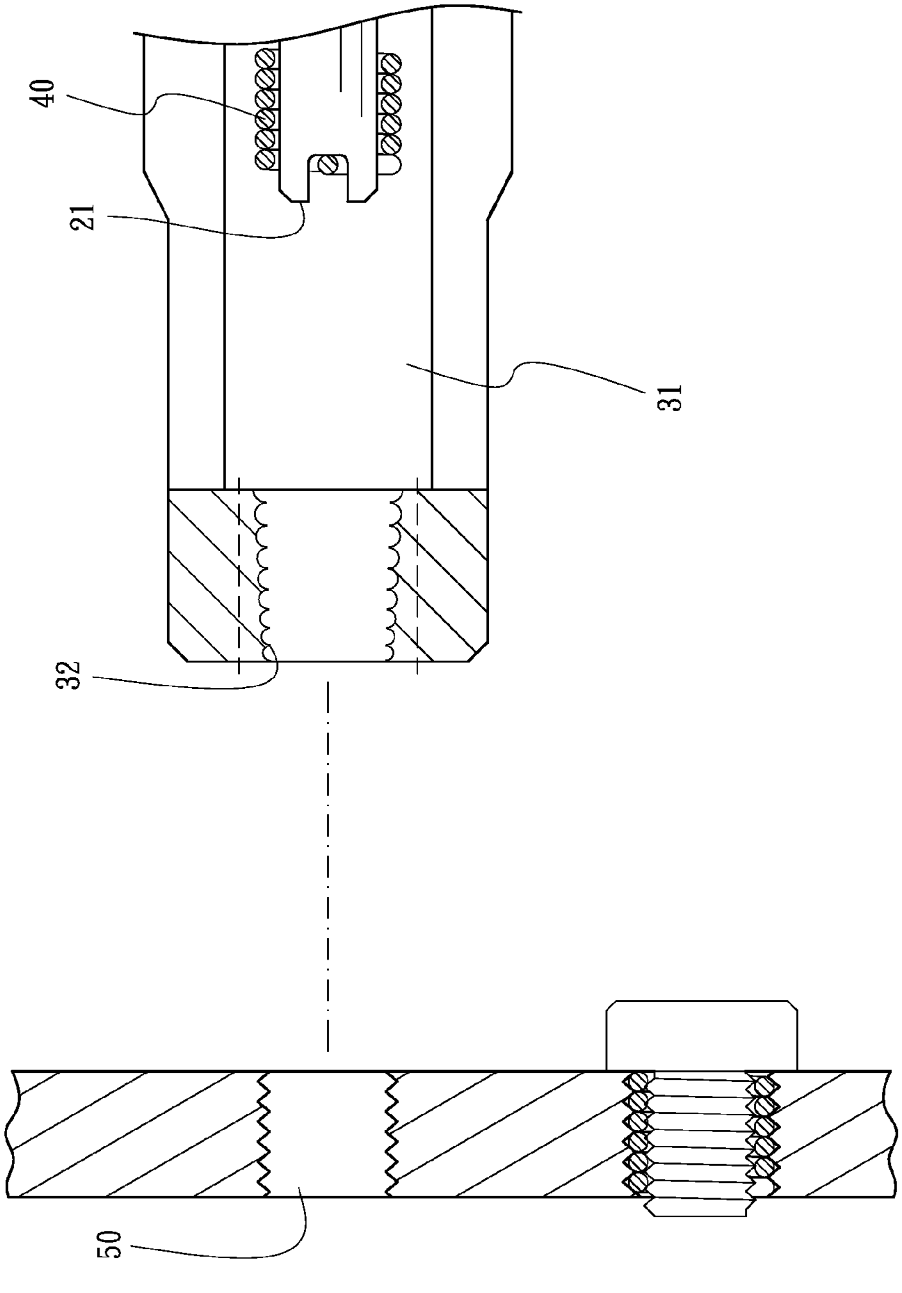
FIG. 3 is a partial cross-sectional view for showing an inclined structure of a threaded hole.
Figure 4:
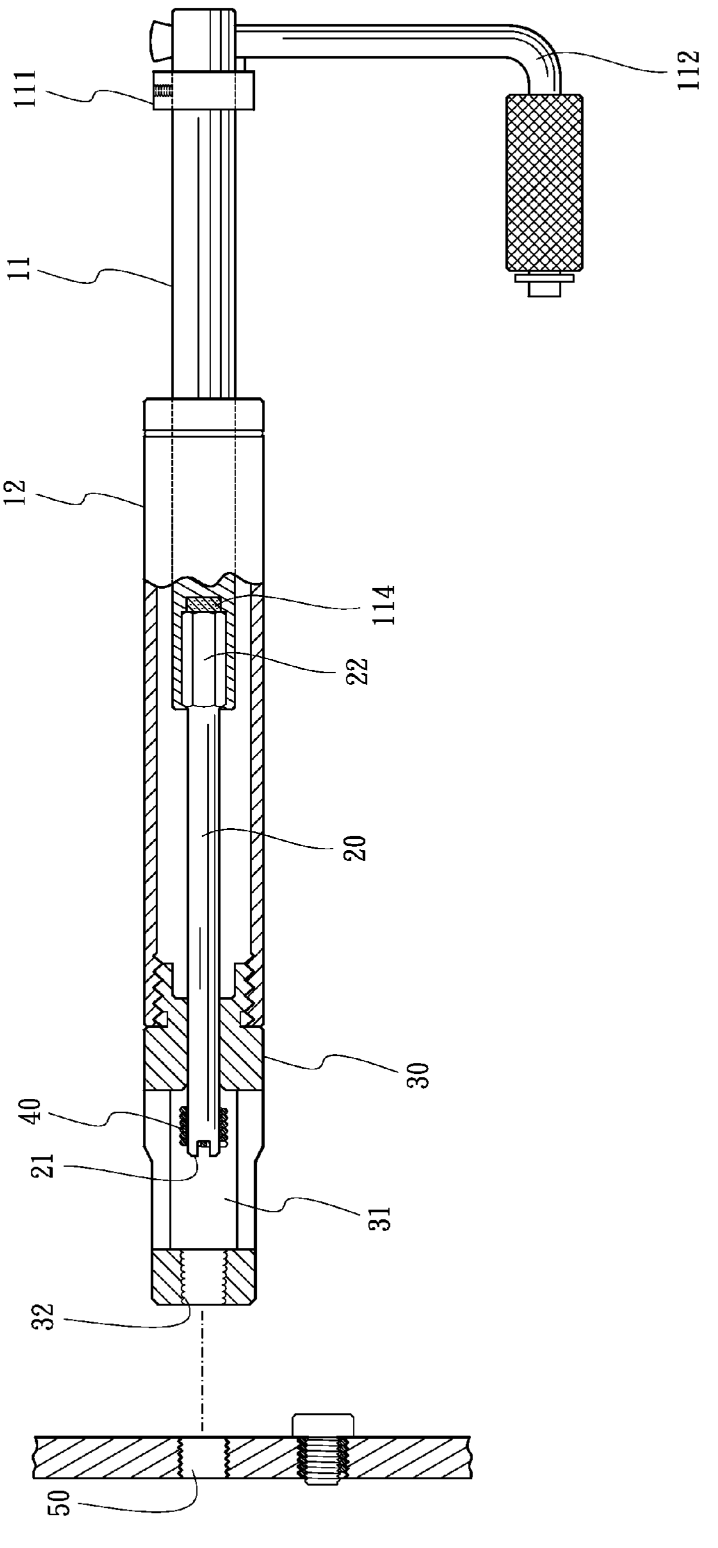
FIGS. 4-6 are assembled views for showing the helical threaded insert inserted into the tapped hole.
Figure 5:
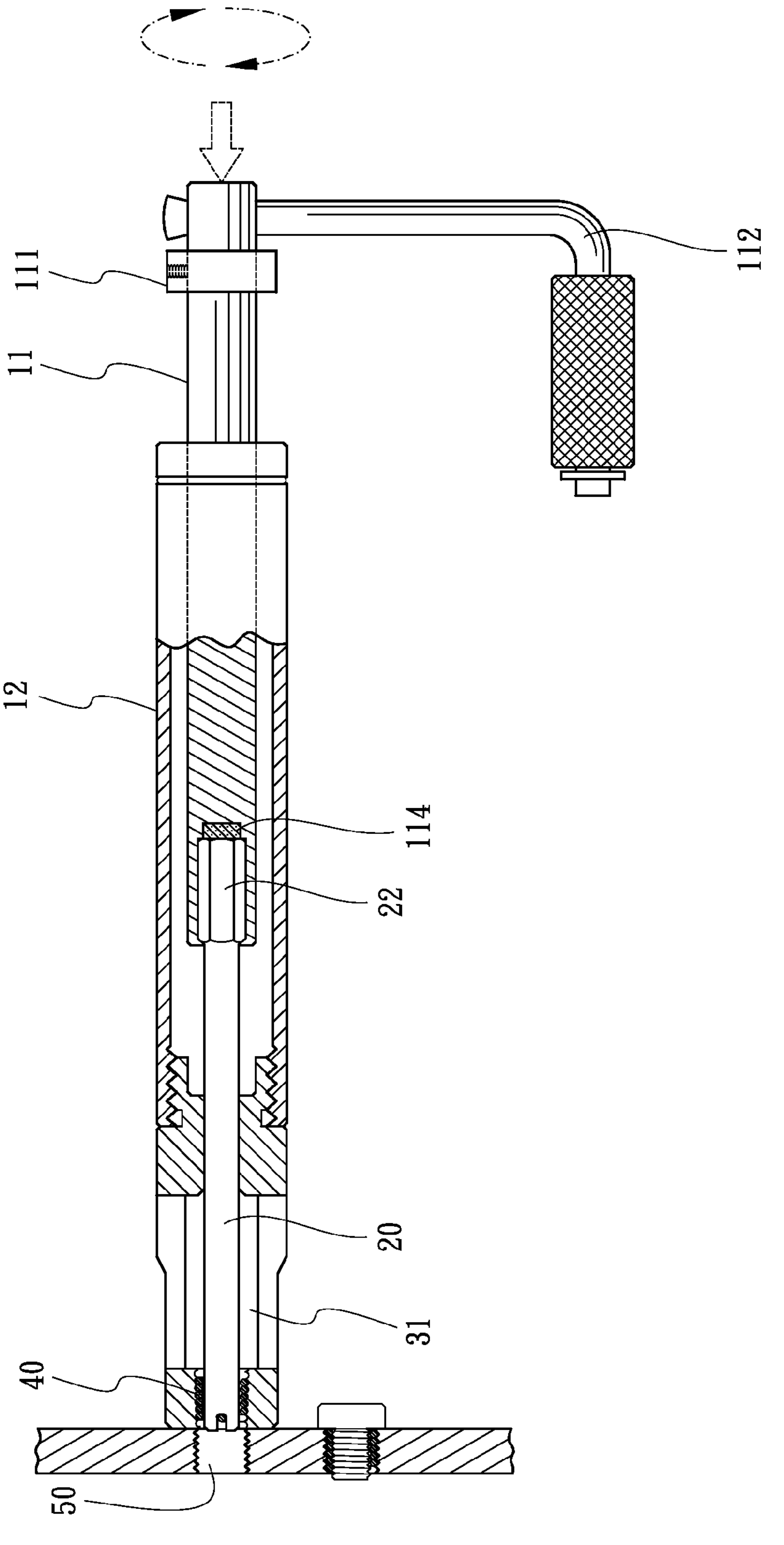
Figure 6:
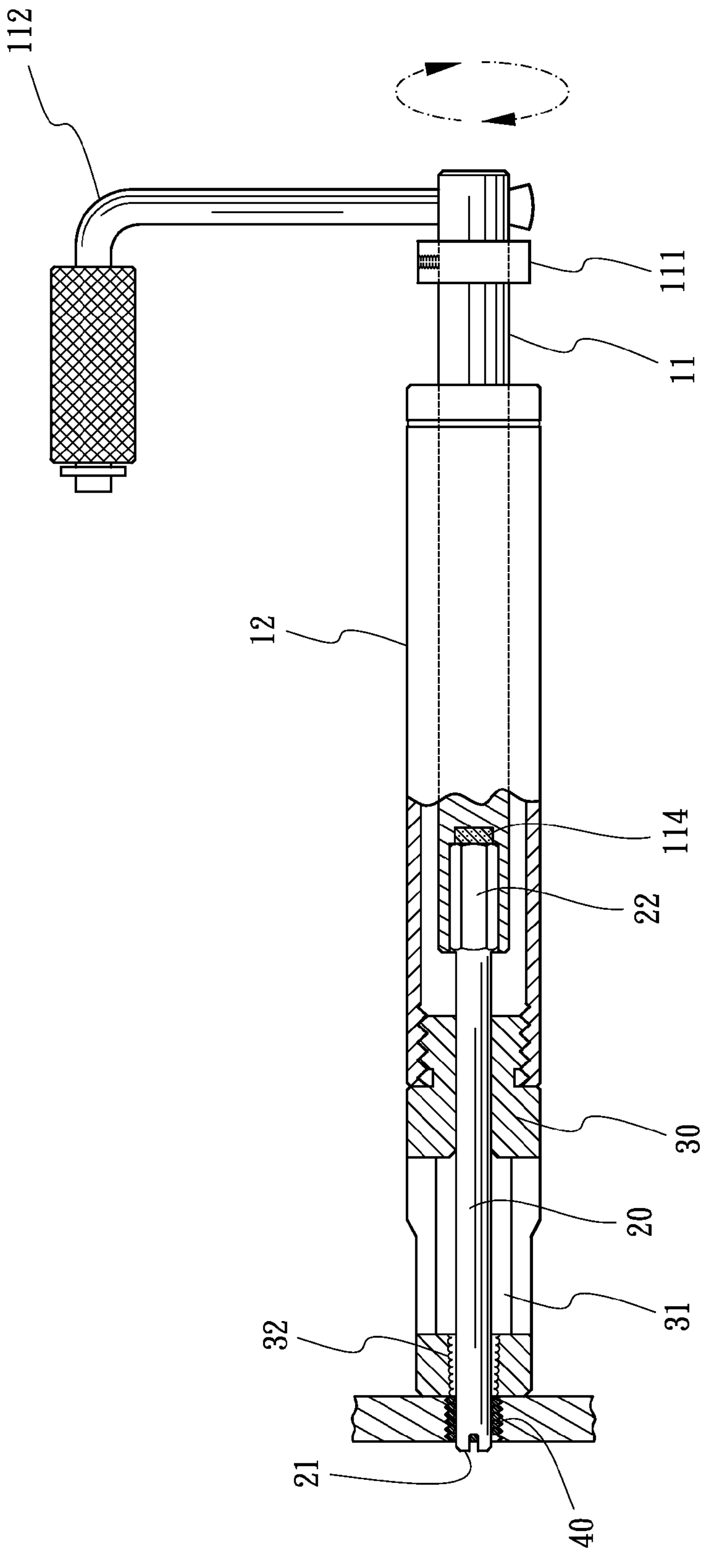
Figure 7:
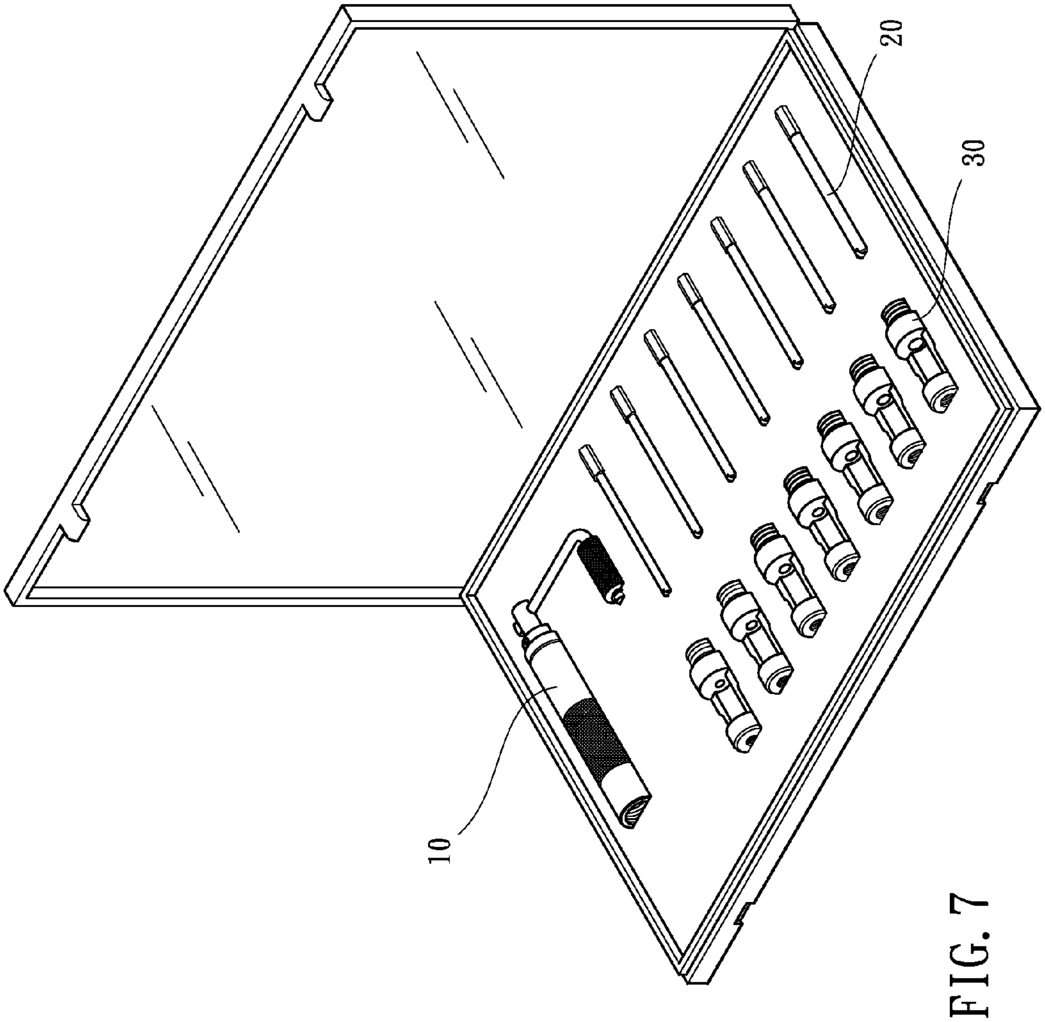
FIG. 7 is a perspective view for a set of the installation tool stored in a tool box.

Referring to the drawings to FIGS. 1-7, an installation tool for inserting a helical threaded insert into a tapped hole in accordance with the present invention comprises a driving mechanism 10. The driving mechanism 10 has an internal tube 11 and an external tube 12. The internal tube 11 is inserted in the external tube 12 and is able to move in or out relative to the external tube 12. At least one metallic mandrel 20 passes through an inner side of the external tube 12 and the mandrel 20 is detachably connected to the internal tube 11. The mandrel 20 has a lead end 21 for engagement with a helical threaded insert 40. The mandrel 20 has a polygon section 22 at an end opposite the lead end for connection to the internal tube 11. At least one head tube 30 is detachably connected to one end of the external tube 12. The lead end 21 of the mandrel 20 is able to pass through the head tube 30. The head tube 30 has a cutout 31 at a lateral side thereof, an alignment portion 34 defined at a front end of the head tube 30, and a threaded hole 32 defined in the alignment portion 34. The cutout 31 in the head tube 30 is provided for loading of the helical threaded insert 40. The threaded hole 32 is configured to reduce the diameter of the helical threaded insert 40 for smooth transition into a tapped hole 50. Specifically, the threaded hole 32 in the head tube 30 is tapered toward the tapped hole 50, as shown in FIG. 3, thereby the helical threaded insert 40 is adjusted to match the size of the tapped hole 50. Consequently, the helical threaded insert 40 may be fed into the tapped hole 50 smoothly, as shown in FIGS. 5 and 6.

In operation, the lead end 21 is firstly pushed to the cutout 31 by moving the internal tube 11 in or out relative to the external tube 12. Afterward, the helical threaded insert 40 is grasped by the lead end 21 (as shown in FIG. 4), and the alignment portion 34 is aimed at the tapped hole 50 for guiding the helical threaded insert 40 into the tapped hole 50. When the internal tube 11 is rotated and pushed to force the helical threaded insert 40 into the threaded hole 32 of the head tube 30, the diameter of helical threaded insert 40 is gradually reduced to match the diameter of the tapped hole 50.

Furthermore, a stop collar 111 may be formed about the internal tube 11 and serves as an abutment with a rear end of the external tube 12, thereby limiting the distance that the lead end 21 of the mandrel 20 may project out of the head tube 30, thus defining a proper depth to which the threaded insert 40 may be installed in the tapped hole 50. A crank handle 112 is disposed at one end of the internal tube 11 for applying torque for installing the threaded insert 40 in to the tapped hole 50. A polygonal recess 113 is defined at the end opposite the crank handle 112 for receiving the mandrel 20. The mandrel 20 has a polygon section 22 for being engaged in the polygonal recess 113 of the internal tube 11. A magnetic member 114 is disposed on a bottom wall of the polygonal recess 113 for strengthen the connection of the internal tube 11 and the mandrel 20, and therefore the mandrel 20 would not fall off easily during the operation.

For the engagement of the external tube 12 and the head tube 30, an internal thread 121 is formed on an inner wall of the external tube 12 corresponding to an external thread 33 of the head tube 30. In this embodiment, the external tube 12 is connected to the head tube 30 by the thread structure, and thus the user can easily assemble or disassemble the installation tool. Besides, an anti-slip surface 122 may be formed on an outer peripheral of the external tube 12. Thus, the user can hold and operate the tool stably during the operation.

The installation tool may further include a series of the mandrels 20 and a series of the head tubes 30. When the user wants to rebuild a broken tapped hole 50, the user only needs to select a suitable mandrel 20 and a corresponding head tube 30 for matching the tapped hole 50. Thus, there are two benefits in the present invention. Firstly, the user only needs to carry one driving mechanism 10 and some suitable mandrels 20 and head tubes 30 for their tasks. Secondly, the helical threaded insert 40 can be adjusted to match the size of the broken tapped hole 50 by the threaded hole 32 so that the user can insert the helical threaded insert 40 into the tapped hole 50 smoothly.

Although the invention has been explained in relation to its preferred embodiment, it is to be understood that many other possible modifications and variations can be made without departing from the spirit and scope of the invention as hereinafter claimed.

What is claimed is:

1. An installation tool for inserting a helical threaded insert into a tapped hole, comprising:

a driving mechanism having an external tube, an internal tube movably inserted in the external tube, and a crank handle configured to rotate the internal tube forward relative the external tube for forcing the helical threaded insert into the tapped hole;

at least one mandrel passing through the external tube and having a rear end detachably connected to the internal tube and a front lead end to be engaged with the helical threaded insert; and at least one head tube detachably connected to one end of the external tube and allowing the front lead end of the mandrel to pass through, the head tube having a cutout at a lateral side thereof, an alignment portion defined at a front end thereof, and a threaded hole defined through the alignment portion, the threaded hole being tapered from rear to front for reducing a diameter of the helical threaded insert for smooth transition of the helical threaded insert into the tapped hole.

2. An installation tool as claimed in claim 1, wherein the driving mechanism further includes a stop collar formed about the internal tube for limiting a distance that the lead end of the mandrel can project out of the head tube.

3. An installation tool as claimed in claim 1, wherein the mandrel has a polygon section formed on the rear end thereof, and the internal tube defines in a front end thereof a polygonal recess for receiving the polygon section of the mandrel.

4. An installation tool as claimed in claim 1, wherein the driving mechanism further includes a magnetic member disposed on a bottom wall of a polygonal recess in the internal tube to attract the mandrel which is metallic.

5. An installation tool as claimed in claim 1, wherein the external tube has an internal thread formed in a front end thereof, and the head tube has an external thread formed on a rear end thereof for engaging with the internal thread of the external tube.

6. An installation tool as claimed in claim 1, wherein the external tube has an anti-slip surface on an outer periphery thereof.

* * * * *